United States Patent [19]
Pareja
[11] 4,381,179
[45] Apr. 26, 1983

[54] PUMPS WITH FLOATING WRIST PINS

[75] Inventor: Ramon Pareja, Edina, Minn.
[73] Assignee: Lear Siegler, Inc., Santa Monica, Calif.

[21] Appl. No.: 272,989
[22] Filed: Jun. 12, 1981

Related U.S. Application Data

[63] Continuation-in-part of Ser. No. 202,463, Oct. 31, 1980, abandoned.

[51] Int. Cl.³ .................... F04B 9/04; F16H 21/08; F16J 1/10; F04B 1/04
[52] U.S. Cl. .................... 417/273; 74/44; 29/156.5 R; 92/187; 92/258; 417/539
[58] Field of Search .................... 417/539, 273; 74/44, 74/60; 92/187, 225, 257, 258; 29/156.5 R, 156.5 A

[56] References Cited

U.S. PATENT DOCUMENTS

| | | | |
|---|---|---|---|
| 781,678 | 2/1905 | Richwood | 417/273 |
| 1,784,837 | 12/1930 | Hiatt | 74/44 |
| 2,612,837 | 10/1952 | Midgette | 417/273 |
| 2,941,475 | 6/1960 | Blair | 417/238 |
| 2,989,227 | 6/1961 | Statham | 417/238 |
| 3,018,737 | 1/1962 | Cook et al. | 74/60 |
| 3,365,979 | 1/1968 | Ericson | 92/187 |
| 3,367,277 | 2/1968 | Andrews et al. | 92/257 |
| 3,431,865 | 3/1969 | Cook et al. | 417/273 |
| 3,877,350 | 4/1975 | Early | 92/187 |
| 4,070,122 | 1/1978 | Wismer | 92/187 |

*Primary Examiner*—William L. Freeh
*Attorney, Agent, or Firm*—Orrin M. Haugen; Thomas J. Nikolai

[57] ABSTRACT

Multi-cylinder in-line and radial pumps having an improved structure for coupling the piston heads to the crankshaft such that the number of parts commonly employed and the size of the resulting pump is greatly reduced when compared to prior art pumps now on the market. Both in-line piston pumps and radial diaphragm pumps are included. The connecting rods comprise plates, each having a bore through the thickness dimension thereof for receiving a cylindrical lobe formed eccentrically on the pump's crankshaft. Formed on one end of each of the connecting rods is a generally cylindrical bore, also extending through the thickness dimension of the connecting rod, the center of this bore being displaced inwardly of the end edge surface of the connecting rod by a distance which is less than the radius of the bore. A cylindrical wrist pin having a flat formed on a peripheral surface thereof is insertable into the bore or recess at the end of the connecting rod and when the pin is rotated so that its flat portion is aligned parallel to the end edge of the connecting rod, it is firmly locked in place but rotatable or floating within the recess. A bore formed perpendicular to the flat on the floating wrist pin is threaded to receive a bolt used to fasten the plunger rod to the floating wrist pin. Other features of the pumps of the present invention include a cylinder head designed to receive sleeve inserts of differing sizes whereby pistons of differing cross-sectional areas can be utilized to vary the capacity of the pump, and grooved shoulders on the connecting rods to cooperate with holding rings around the crankshaft.

16 Claims, 8 Drawing Figures

PUMPS WITH FLOATING WRIST PINS

CROSS-REFERENCE TO RELATED APPLICATION

The present application is a continuation-in-part of my copending application Ser. No. 202,463, filed Oct. 31, 1980, now abandoned, entitled "HIGH PRESSURE PUMP WITH FLOATING WRIST PIN" and assigned to the same assignee as the present application.

BACKGROUND OF THE INVENTION

I. Field of the Invention

This invention relates generally to pump apparatus for pumping fluids at relatively high pressures, and more particularly to the improved design of a pump whereby the construction thereof is greatly simplified and the overall size is significantly reduced when compared to prior art pumps having corresponding capacities.

II. Discussion of the Prior Art

Heretofore it has been the practice in the fluid handling arts to design pump structures so as to include a piston or plunger assembly which is secured to the end of a piston rod which, in turn, is joined to a crosshead. The crosshead is then mechanically linked to the crankshaft through a connecting rod which conventionally includes a sleeve bearing or bushing and a crosshead pin for joining the end of the connecting rod to the crosshead. The other end of the connecting rod has a generally semicircular yoke so as to receive a circular lobe on a crankshaft and a second semicircular clamp member must be bolted in place to firmly hold the connecting rod to the crankshaft. It is also a common practice to include a shell-type bearing which may be babbitt-lined between the mating parts of the connecting rod and the crank surface with which it cooperates. The combination of the connecting rod and the crosshead converts the rotary motion of the shaft to reciprocatory motion of the piston or plunger. This conventional construction includes a comparatively large number of parts and, further, tends to unduly increase the overall length of the pump structure.

Furthermore, it has been common practice in the past to specifically design individual pumps to meet desired performance goals in terms of pressures and flow rates. This necessarily creates problems for a manufacturer in that he is unable to take advantage of economies of scale. It would therefore appear advantageous if a pump mechanism could be designed so that by merely providing an adapter sleeve in the cylinder block, the same cylinder block, crankcase assembly, plunger push rods, seals, guides and other items may be used in pump structures designed to meet a variety of operating parameters.

Typical of the prior art over which the present invention is deemed to be a significant improvement is the Model 820 pump manufactured and sold by Cat Pumps Corporation of Minneapolis, Minn. and the Model 420 Triplex pump manufactured and sold by the John Beam Division of the FMC Corporation of Lansing, Mich. The reader is referred to the Data Sheets of those companies for a more detailed description of the prior art against which the present invention is to be compared.

SUMMARY OF THE INVENTION

Fluid handling pumps designed in accordance with the teachings of the present invention result in a simplified construction which reduces the number of parts commonly employed in the prior art, a simplified assembly during manufacture and a reduction in the overall size as compared to the prior art, all this without a sacrifice in reliability in terms of useful life and mean time to repair. Furtermore, pumps made in accordance with the present invention may be made to accommodate a wide variety of applications of varying capacities without an undue increase in the number of parts which the manufacturer must fabricate and maintain to manufacture and service the pumps, and may have plural cylinders oriented in-line or radially.

The foregoing advantages are achieved through the novel design of a connecting rod and a floating wrist pin combination which eliminates the need for the prior art connecting rod having a separable clamp and bolts therefore, the prior art crosshead and wrist pin and the conventional, prior art piston rod normally used to join the crosshead to the piston or plunger element per se.

Multi-cylinder in-line pumps constructed in accordance with the teachings of the present invention include a crankcase assembly in which is disposed a crankshaft which may typically include a plurality of cylindrical lobes (one for each cylinder) which are formed eccentrically with respect to the axis of the shaft. The direction of eccentricity on each of the lobes is determined by the number of pistons to be employed. For example, in a three-piston configuration, the direction of eccentricity of the lobes may be 120° apart which, of course, is entirely conventional. The connecting rods of the present invention differ markedly from existing designs. Instead of comprising an elongated flat shaft terminating at one end in a cylindrical bore for receiving the crosshead wrist pin and at the other end in a generally semicircular yoke for receiving the crankshaft, each of the connecting rods of the present invention comprises a plate of constant thickness which is circular over an arc in excess of 180° and which then tapers inwardly to a flat end edge surface. Formed through the thickness dimension of the plate is a circular bore which is adapted to encompass a shell-type bearing for surrounding a cylindrical eccentric lobe on the crankshaft. On the flat end edge of the connecting rod is a further cylindrical bore which extends through the thickness dimension of the plate. The center of this last-mentioned bore is displaced inwardly of the end edge surface of the plate by a distance which is less than the radius of the bore and, as such, comprises an arcuate recess in the end of the connecting rod. Disposed within this latter bore is a generally cylindrical wrist pin having a flat surface formed on the peripheries thereof. In this fashion, the pin may be inserted into the circular recess and turned so that the flat surface is aligned with the plane of the end edge of the connecting rod plate. When in this orientation, the wrist pin is free to rock back and forth within the recess but it is retained in the recess. A further hole is formed into the floating wrist pin perpendicular to its flat surface, this hole being threaded so as to receive a bolt. The piston rod, then, simply comprises a tubular sleeve which is journaled for reciprocal movement in cylinder head guides. Disposed on the end of the piston rod is the piston itself and these members are held in place by a bolt passing through the piston, the piston rod and into the threaded bore in the floating wrist pin.

The cylinder head is designed with piston receiving bores of a size such that it may receive an insert sleeve for permitting pistons of varying sizes to be used. This provides a convenient means for varying the capacity of the pump in terms of its flow rate and pressure while utilizing the same pump structures including the crankcase, cylinder head, crankshaft and main bearings, connecting rods, piston rods, guides, seals, valves, etc.

Multi-cylinder radial pumps constructed in accordance with the teachings of the present invention include a crankcase assembly in which is disposed a crankshaft having a single cylindrical lobe which is formed eccentrically with respect to the axis of the shaft and continuously engaged by a plurality of connecting rods to drive the pistons in and out radially. Each connecting rod comprises a first end arcuately concaved to engage a portion of the circumference of the eccentric lobe with the crankshaft, and a second end having a cylindrical bore, the center of which is displaced inwardly from the end of the rod by a distance which is less than the radius of the bore, to define an arcuate recess. This recess receives a wrist pin secured to the piston in the cylinder as described above. The connecting rods are held in contact with the crankshaft by rings riding in grooves formed in axial extensions of the first ends of the connecting rods, and the entire assembly runs in a bath of lubricant.

This embodiment of the invention is particularly useful in pumps where the actual pumping action is accomplished by diaphragms in the cylinders, actuated by the piston.

OBJECTS

It is accordingly a principal object of the present invention to provide an improved design for a multi-cylinder piston pump.

Another object of the invention is to provide a design of a multi-cylinder piston pump of a given capacity which is generally smaller in size than prior art arrangements having corresponding capacities.

A further object of the invention is to provide in a multi-cylinder fluid handling pump an improved connecting rod means for coupling the piston to the connecting rod whereby original assembly and subsequent repair of the pump is facilitated.

A still further object of the invention is to provide in a multi-cylinder pump an improved means for coupling a piston rod to a crankshaft wherein the number of parts employed is significantly reduced over that required by prior art designs and wherein the size of the machine may be significantly reduced.

Yet another object of the invention is to provide a multi-cylinder pump in which the capacity thereof may be varied by simple replacement of plunger and plunger guide assemblies in the cylinder head.

These and other objects and advantages of the invention will become apparent from the following detailed description of a preferred embodiment, especially when considered in conjunction with the accompanying drawings in which like parts in the several views bear corresponding reference numerals.

DESCRIPTION OF A FIRST PREFERRED EMBODIMENT

Figure 1:
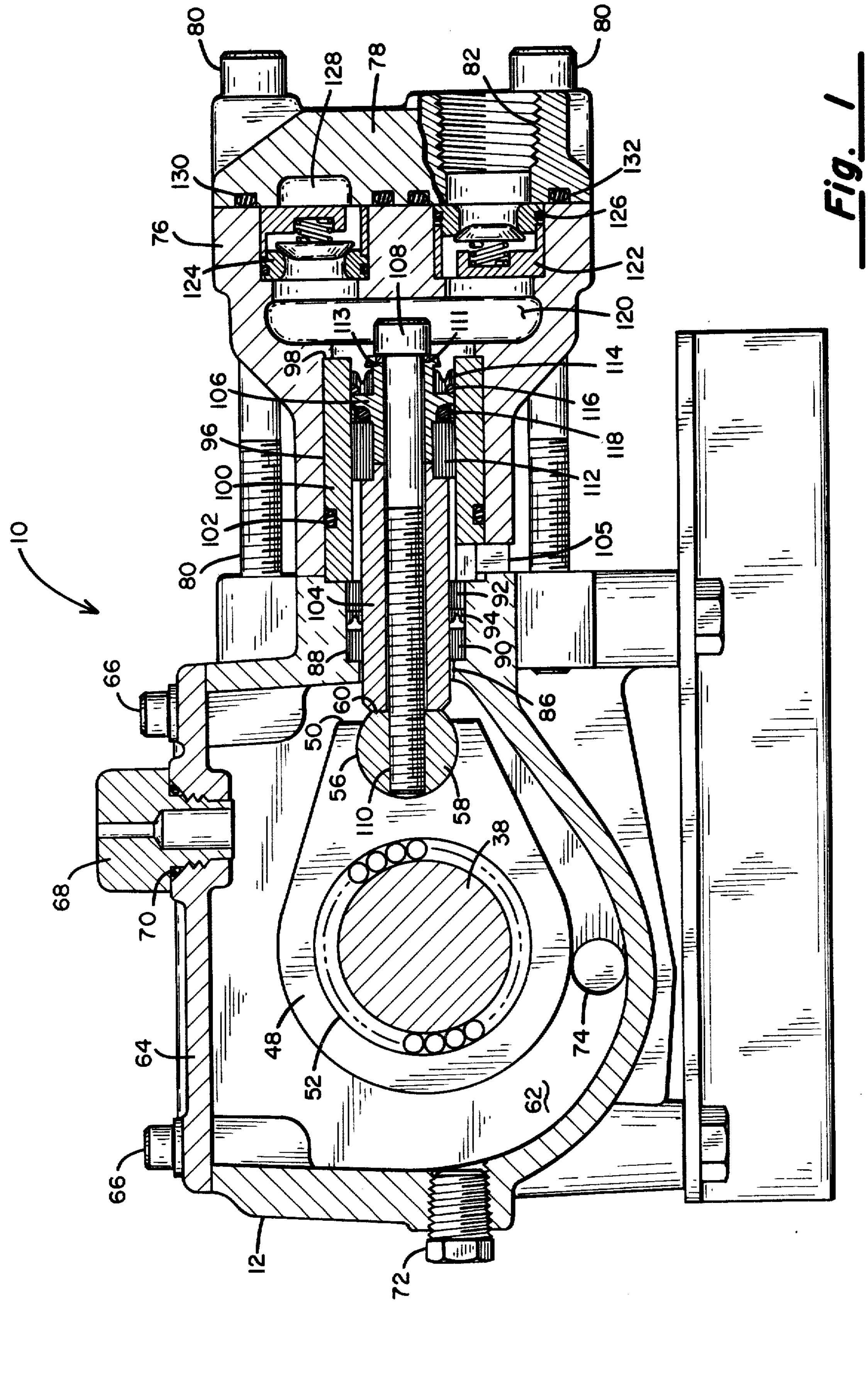
FIG. 1 is a side cross-sectional view of a multi-cylinder pump in accordance with the teachings of the invention.

Referring to the drawings, the multi-cylinder pump is indicated generally by numeral 10. In the particular embodiment illustrated, the pump 10 includes three cylinders, it being understood, however, that the principles of the invention can be applied to configurations having a greater or lesser number of cylinders. With this in mind, and with reference to FIGS. 1 and 2, there is illustrated a crankcase housing 12 which may be a metal casting. Formed through the opposed side surfaces of the crankcase are axially aligned bores 14 and 16 into which a crankshaft 18 may be journaled for rotation. Specifically, there is disposed in the front bore 14 of the crankcase 12 a bearing retainer sleeve 20 which serves to hold the front main needle bearing assembly 22 and a shaft seal member 24. Flow of oil from the crankcase through the joint between the crankcase 12 and the bearing retainer 20 is prevented by including a O-ring 26 disposed in a notch provided for it. The bearing retainer 20, along with the main bearings 22 and the shaft seal 24, are held in place by means of a snap-ring 28.

Supporting the rear end 30 of the crankshaft 18 is a rear needle of the closed-end type bearing 32 which is retained in the bore 16 by means of a press fit. Thus, it can be seen that the crankshaft 18 is free to rotate about a central axis identified by the centerline 36.

Figure 2:
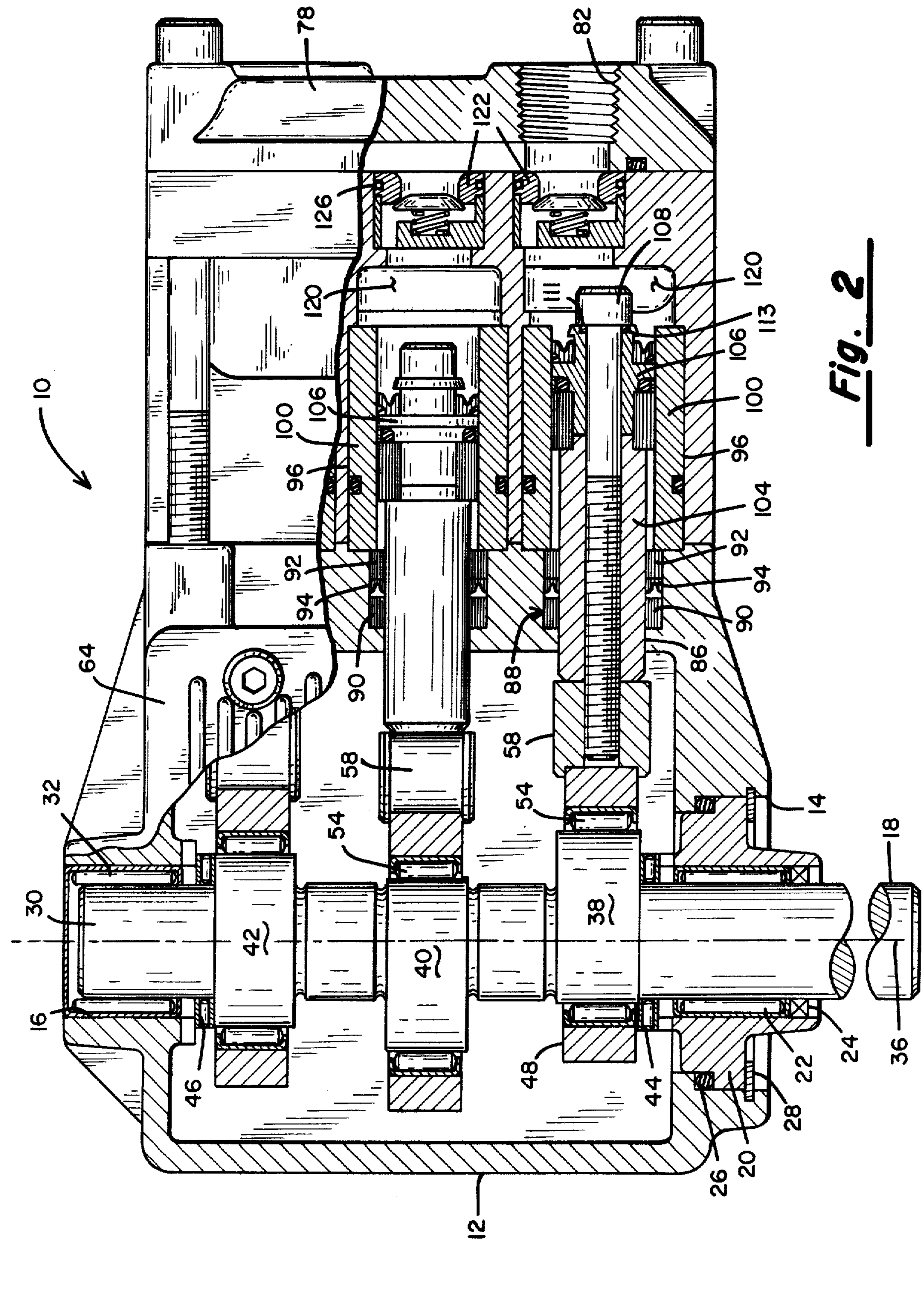
FIG. 2 is a partially cross-sectioned top view of the embodiment of FIG. 1.
Figure 3:
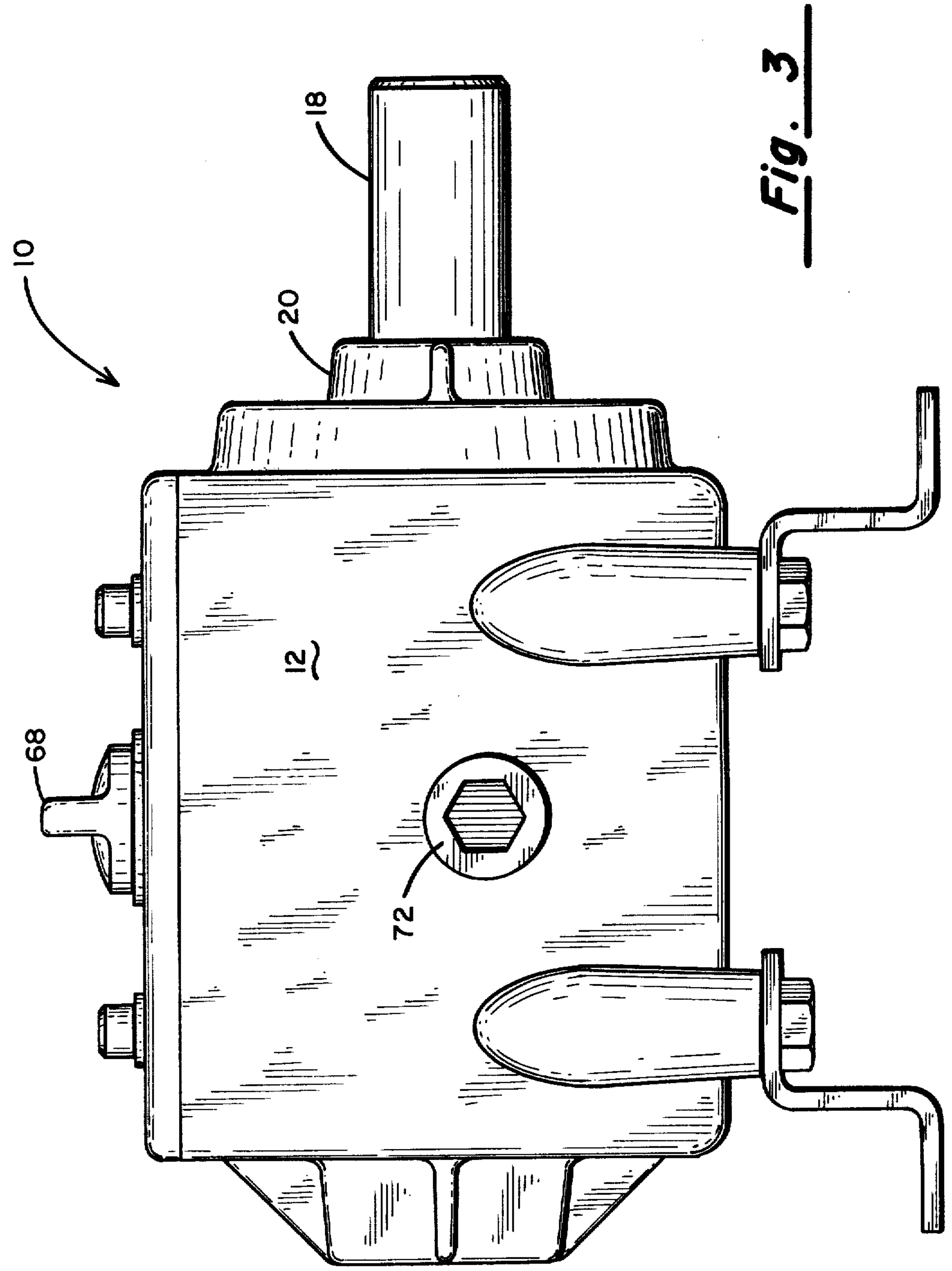
FIG. 3 is a left end view of the pump.
Figure 4:
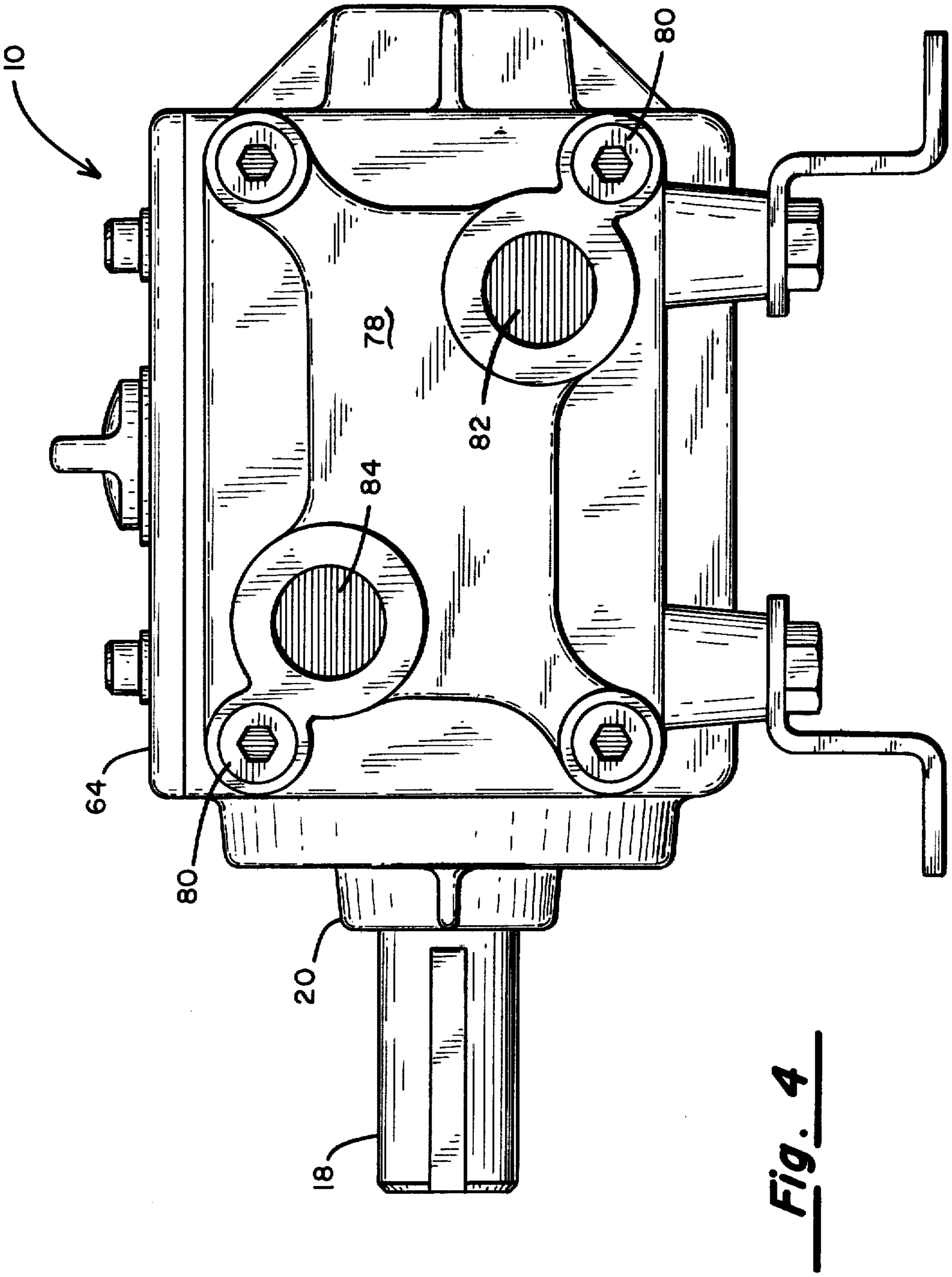
FIG. 4 is a right end view.

Formed on the crankshaft 18 are a plurality of cylindrical lobes 38, 40 and 42, the centers of which are eccentrically displaced from the centerline 36 of the crankshaft 18. In a typical arrangement, the directions of eccentricity are symmetrically disposed on the crankshaft so that with a pump structure involving three cylinders, these directions are respectively displaced 120° from one another. Cooperating with the frontmost lobe 38 and the rearmost lobe 42 in FIG. 2 are thrust bearing assemblies 44 and 46 which restrain the crankshaft 18 from axial displacement within the crankcase.

Surrounding each of the lobes 38–42 is a connecting rod member as at 48. As can best be seen in FIG. 1, connecting rods 48 comprise a single piece having a generally circular profile in their side elevation over a predetermined circular arc greater than 180° and then having straightline edges extending tangentially from the circular arcs ending at a forward edge 50. As is indicated in FIG. 2, each of the connecting rods 48 is of a constant thickness and formed concentrically with the arc defining the outer curved periphery thereof is a central bore 52 of a predetermined diameter greater than the diameter of the lobe 38–42 which it surrounds. To provide relatively friction-free rotation of the connecting rod 48 with respect to its mating lobe 38–42 there is disposed in the bore 52 a shell-type roller bearing assembly 54 which is adapted to be press fitted into the bore 52 of the connecting rod.

Also formed through the thickness dimension of the connecting rod 48 is a second and smaller bore 56 (FIG. 1) having its center on a perpendicular joining the center of the bore 52 to the center of the planar edge 50 and displaced inwardly from the front edge 50 of the connecting rod by a distance less than the radius of that bore. As such, the bore 56 forms an arcuate recess in excess of 180° in the front edge surface of the connecting rod. Fitted within this recess is a floating wrist pin member 58 having an outside diameter slightly less than the diameter of the bore 56, allowing a clearance fit therein, and having a flat surface as at 60 formed thereon. Because of this flat surface, it is possible to insert the wrist pin 58 into the bore 56 by aligning the flat portion generally perpendicular to the front face 50 of the connecting rod, inserting the wrist pin 58 into the recess 56 and then rotating the wrist pin 58 so that the flat surface 60 thereof is generally parallel to the front edge 50 of the connecting rod. Because of the dimensioning of the bore 56, a portion of the connecting rod 48 extends over center on the wrist pin and effectively precludes the wrist pin from being withdrawn from its recess so long as the flat surface 60 remains generally parallel to the front edge 50 of the connecting rod.

As is conventional, the crankcase 12 is arranged to contain a suitable lubricant in the volume 62 thereof and a removable coverplate 64 is bolted, as at 66 to cover the access opening. A oil fill plug 68 is arranged to be threadedly inserted in a bore formed through the coverplate 64 and a O-ring 70 ensures a leak-free fit. A drain plug 72 is provided proximate the longitudinal centerline of the pump and when the pump is disposed in a vertical orientation, the lubricant may be drained from the crankcase 62 via the port sealed by the plug 72. A further drain plug opening 74 is provided for receiving a further drain plug (not shown) which may be removed to drain the lubricant when the pump is oriented in a generally horizontal configuration as in FIG. 1 of the drawings.

The multi-cylinder pump 10 further includes a cylinder block 76 and a valve cover 78 which are arranged to be held in place on the crankcase housing 12 by means of elongated bolts 80 which pass through apertures formed through the valve cover 78 and the cylinder block 76 as indicated. Formed through the valve cover 78 is a threaded inlet port 82 and a threaded outlet port 84 to which a source of low pressure fluid to be pumped may be connected and to which a utilization device may be connected, respectively.

As can be seen from the cross-sectional views of FIGS. 1 and 2, for each of the cylinders there is formed through the front planar surface of the crankcase housing 12 a bore 86 and a counterbore 88. Arranged to be fitted into each of the counterbores 88 is a sandwiched combination of first and second graphite guide rings 90 and 92 and a soft, flexible cup seal member 94.

Formed in the end of the cylinder block 76 which abuts the crankcase 12 are a plurality of parallel bores as at 96, the bores terminating at shoulders 98 and adapted to receive a cylindrical adapter sleeves 100 therein. An O-ring 102 is disposed in an annular groove to achieve a seal between the adapter sleeves 100 and the side walls of the bores 96 formed in the cylinder head. It may be noted that the end of the sleeve 100 serves to retain the guide rings 90–92 and the cup seal 94 within the counterbore formed in the end of the crankcase housing 12.

Each of the piston assemblies employed comprise a tubular push-rod 104 which is insertable through a bore 86 in the crankcase housing and into a bore 96 in the cylinder block 76. The guide rings 90 and 92 and the cup seal 94 allow reciprocatory motion of the push rod 104. The cup seal 94 is arranged to prevent oil from the crankcase 62 from contaminating the fluid to oe pumped and vice-versa. At the sleeve 100 surface adjacent to the crankcase 12, there is a slot 105 which is open to the atmosphere and it prevents contamination of the lubricant or of the fluid being pumped in the event either should leak.

Abutting the end of each of the push-rods 104 is a plunger head member 106. A threaded bolt 108 passes through the plunger head members 106 and through the push-rods 104 and into threaded bores 110 formed in the wrist pins 58, the axes of the bores 110 being normal to the flat surface 60 thereof. Also, to prevent lubricant contamination, the threaded bolt 108 is compressing a copper gasket 111 into a shallow counterbore 113 on the top of the plunger head member 106. Clamped in position by the plunger head 106 and an annular recess formed in the forward end of the push rod 104 is a graphite guide ring 112 which cooperates with the inside diameter of the adapter sleeve 100 to provide smooth reciprocatory motion. To preclude the fluid being pumped from seeping between the plunger head 106 and the cylinder adapter 100, a cup seal member 114 is provided in a annular recess formed in the plunger head 106. A support ring 116 serves to prevent the cup seal 114 from extruding during the compression cycle. A still further seal in the form of a seal ring and expander O-ring combination 118 may also be included.

Also formed in the cylinder block 76 are a plurality of chambers as at 120, there being one such chamber for each cylinder utilized in the multi-cylinder pump configuration. Also associated with each of the cylinders in the device is an inlet poppet valve as at 122 and an outlet poppet valve as at 124. The inlet poppet valves 122 are disposed in bores formed in the end surface of the cylinder block 76 so as to selectively open or block fluid flow between the chambers 120 and the respective inlet and outlet ports 82 and 84. O-ring seals 126 are included to preclude leakage between the outside of the valves 122 and 124 and the interior surfaces of the bore formed in the end surface of the cylinder block 76.

The type of poppet valve used for the inlet valve 122 and the outlet valve 124 may be of the kind described in the Pareja U.S. Pat. No. 4,032,263, which is assigned to the assignee of the present invention. Hence, nothing further need be said concerning its construction in that those wishing additional information pertaining to it may refer to that patent.

During a suction stroke of a piston, the fluid to be pumped is drawn in through an inlet poppet valve 122 and into the chamber 120. On the pressure stroke, the inlet valve closes, thereby blocking the inlet port and pressure is applied to the fluid in the chamber 120 whereby the outlet poppet valve 124 will open allowing fluid to exit via a channel 128 which communicates with each of the outlet valves and with the outlet port 84. Identified by numerals 130 and 132 in FIG. 1 are further O-ring seals which preclude leakage of fluid between the mating surfaces of the valve cover 78 and the end of the cylinder block 76.

The pump is operated by connecting a source of fluid to be pumped to the inlet port 82 and by connecting an output line to the outlet port 84. Now, when the crankshaft 18 of the pump is driven by a source of motive power (not shown) the eccentric lobes 38, 40 and 42 rotate and operate through their connecting rods 48 and associated floating wrist pins 58 to impart a straight-line reciprocating motion to the plunger assemblies including the plunger rod 104, the plunger head 106 and its associated guides 112 and seals 114. During the suction stroke when the poppet valve 122 opens, the low pressure fluid enters the chamber 120 for that cylinder and as the crankshaft continues to rotate, the push rod assembly will move in the opposite direction to apply a relatively high pressure force to the fluid sufficient to overcome the force exerted by the spring in the poppet valve 124 and that valve will open to allow the high pressure fluid to exit via the channel 128 to the outlet port 84. Similar action takes place in all of the cylinders as the crankshaft with its offset eccentric lobes is rotated.

The principal advantage afforded by the present invention is the reduction in complexity of the machine occasioned by the design of the connecting rod 48 and its associated floating wrist pin 58. Not only are the assembly operations simplified, but the overall length dimension of the pump can be considerably reduced when compared to existing prior art designs of which I am aware.

During assembly, the crankcase housing 12 has its cover 64 removed, exposing the interior of the crankcase housing. The rear main needle bearing 32 is fitted into the bore 16 of the crankcase housing and a series of connecting rods 48 are prepared by having the shell-type roller bearings 54 press-fitted therein and the floating wrist pins 58 inserted into the arcuate recess 56. The crankshaft 18 is then inserted through the front bore 14 of the crankcase housing and as its rear end portion 30 is moved toward the end cup bearing 32 a series of connecting rod assemblies 48-54 are slipped over the lobes 38, 40 and 42 formed on the crankshaft 18. The end 30 of the crankshaft is then slipped through the thrust bearing 46 and journaled within the rear needle bearings 32.

Next, the bearing retainer assembly 20 is prepared by inserting the shaft seal 24 therein, followed by the front main needle bearings 22. The O-ring 26 is fitted about the bearing retainer 20 and after the front thrust bearing 44 is slipped over the end of the shaft 18, the bearing retainer assembly is fitted onto the shaft and ultimately held in place with a snap ring 28.

Next, the push rod seal assembly including the graphite guide ring 90, the cup seal 94 and the further graphite guide ring 92 are inserted in the counterbore 88 formed in the front end of the crankcase housing 12.

Following this, the cylinder block 76 is prepared by having adapter sleeves 100 of a desired dimension and their associated O-rings 102 inserted into the plunger bores 96. Once that has been done, the plunger assemblies are constructed by first inserting the bolts 108 through the gasket 111 and their associated plunger head members 106. The cup seals 114 and associated rings 116 are fitted in place on the plunger head member 106 and a graphite guide ring 112 and seal 118 are slipped onto the plunger head member. Next, the plunger rod 104 is positioned over the bolt 108 and this assembly is guided through the members 90, 94 and 92 so that the end of the plunger rod 104 is made to abut the flat formed on the surface of the floating wrist pin 58. The bolts are then tightened whereby the plunger heads 106, the plunger rods 104 and the floating wrist pins 58 are held together.

Following that, the unitary inlet valves 122 and outlet valves 124 are disposed in the bores formed in the end of the cylinder block, the various seals 130 and 132 are positioned in recesses formed in the valve cover 78 and that valve cover is juxtaposed against the mating surface of the cylinder block 76 and held in place by the elongated bolts 80 passing through the valve cover 78, the cylinder block and into threaded bores formed in the crankcase housing 12.

First of all, it is to be noted that the connecting rod 48 is a unitary member not requiring the conventional semicircular yoke and clamp assembly commonly used to fasten connecting rods to a crankshaft. Furthermore, the connecting rod does not include the conventional elongated linkage arm leading to a crosshead and the conventional bronze alloy bushings and crosshead pins utilized in prior art assemblies. In fact, the crosshead itself is dispensed with, a simple cylindrical pin with a flat surface formed thereon (the floating wrist pin 58) taking the place of the aforementioned collection of parts.

Thus, it can be seen that the present invention not only simplifies the overall manufacture of the pieceparts in question, but it also simplifies the manufacturing assembly operations.

To further enhance the manufacturability of the multi-cylinder pump of the present invention, it has been designed so that the capacity of the pump may be changed by merely incorporating adapter sleeves 100 of differing wall thicknesses and by providing plunger head members 106 in a range of sizes corresponding to the inside diameter of the adapter sleeves 100 employed.

Table I below illustrates the manner in which the flow rate and fluid outlet pressure may be varied by utilizing pump pistons of differing diameters when the pump is driven at a fixed speed of 1,750 rpm by motors of differing horsepower capacities. In arriving at these values, it is assumed that the eccentricity of the lobes 38-42 with respect to the axis of the crankshaft 18 provides a piston stroke of 0.414 inches. These figures are provided for exemplary purposes only and with no limitations intended in that it is deemed to fall within the realm of ordinary skill in the art to vary the dimensions of the parts somewhat so as to arrive at pumps affording differing operating parameters from those set forth in the table.

TABLE I

| MOTOR | | PUMP | | |
|---|---|---|---|---|
| H.P. | SPEED | PISTIN DIA. (IN.) | FLOW (GPM) | P.S.I. |
| 3 | 1750 | $\frac{3}{4}$ | 4 | 1100 |
| $3\frac{1}{4}$ | 1750 | $\frac{3}{4}$ | 4 | 1200 |
| 3 | 1750 | $\frac{7}{8}$ | 5.5 | 800 |
| $3\frac{1}{2}$ | 1750 | $\frac{7}{8}$ | 5.5 | 1000 |
| 3 | 1750 | 1 | 7.0 | 650 |
| $3\frac{1}{2}$ | 1750 | 1 | 7.0 | 750 |
| 3 | 1750 | $1\frac{1}{8}$ | 9.0 | 500 |
| $3\frac{1}{2}$ | 1750 | $1\frac{1}{8}$ | 9.0 | 600 |

DESCRIPTION OF A SECOND PREFERRED EMBODIMENT

Figure 6:
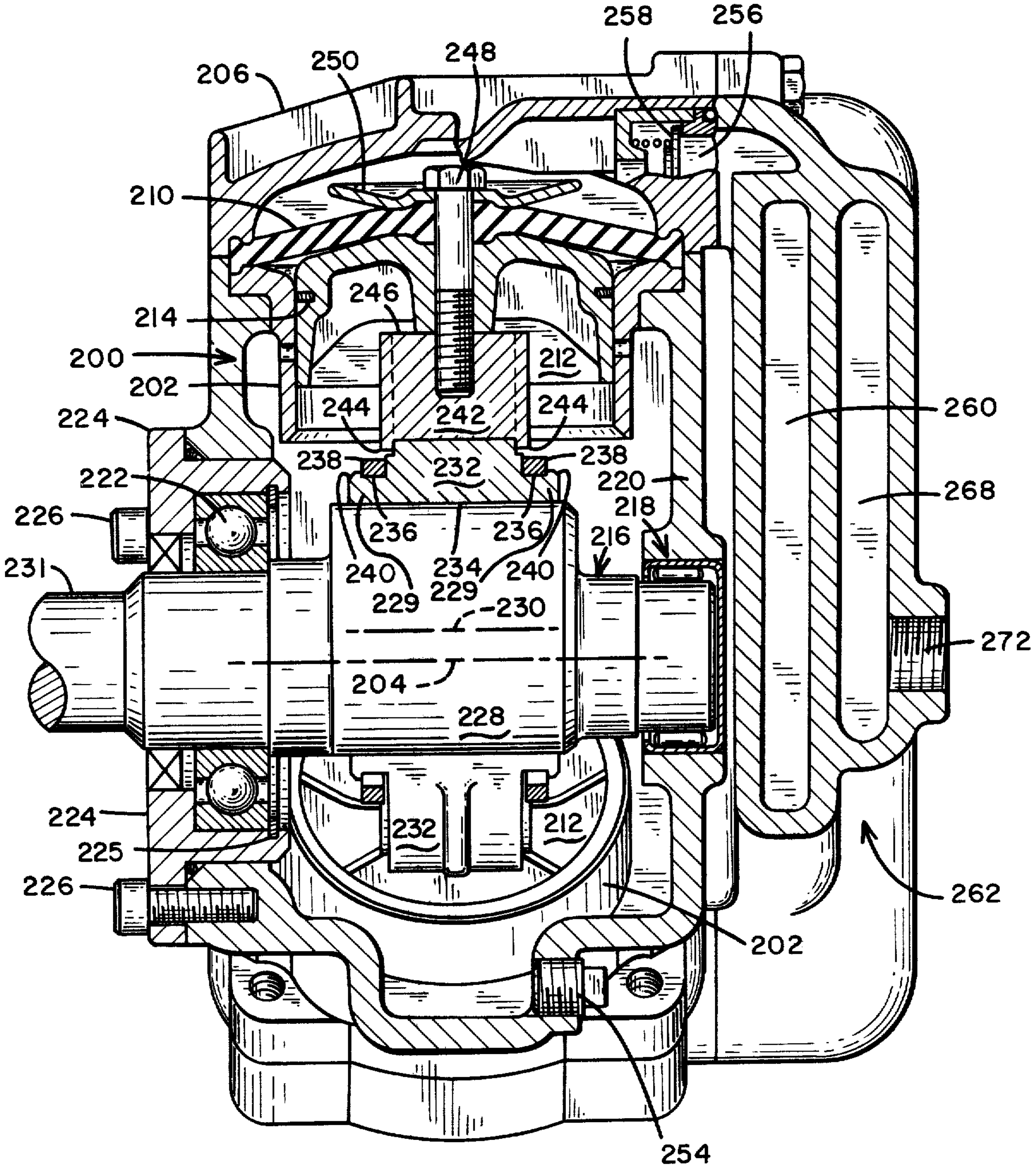
FIG. 6 is an axial cross-section of a second pump embodying the invention.
Figure 7:
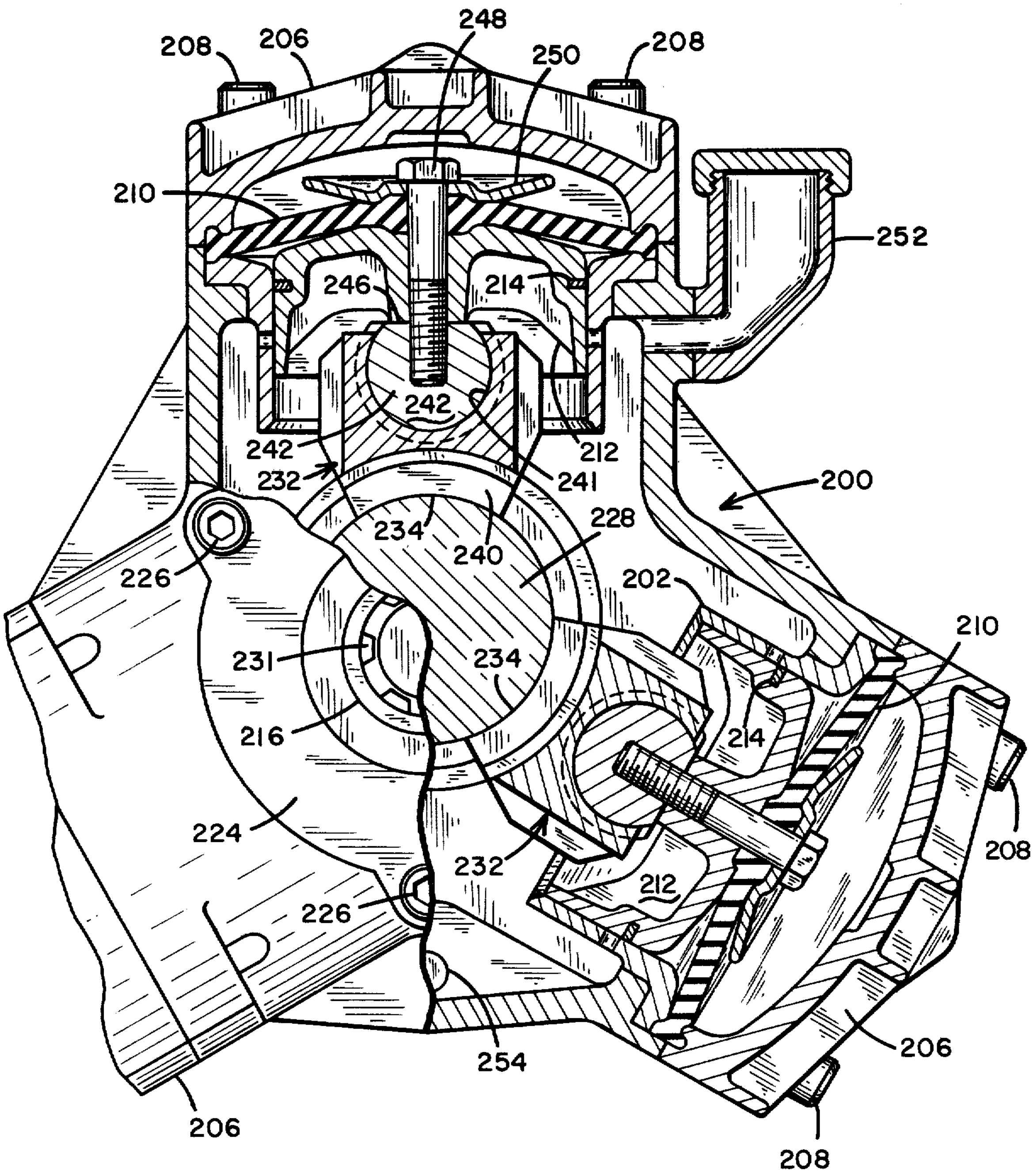
FIG. 7 is an end view of the pump of FIG. 6 seen from the left, with parts broken away or shown in section.

FIGS. 6 and 7 show an embodiment of the invention in which the cylinders are radially oriented about the axis of a crankshaft, and in which diaphragms are associated with the pistons. A crankcase 200 is arranged to receive three cylinder liners 202 at 120° spacing about an axis 204. Cylinder heads 206 secured to crankcase 200 by fasteners 208 clamp pumping diaphragms 210 against the ends of liners 202. Pistons 212 move in liners 202 and are provided with piston rings 214.

A crankshaft 216 rotates on axis 204 in a first bearing 218 at one end 220 of crankcase 200, and a second bearing 222 is secured in an end plate 224 by a snap ring 225, plate 224 being fastened at the other end of crankcase 200 by fasteners 226. A crank portion 228 eccentric on crankshaft 216 is circular in section transverse to an axis 230 parallel to axis 204. Crankshaft 216 is provided with driving splines 231.

Three connecting rods 232 extend radially between inner ends and outer ends. Each connecting rod includes an arcuate concave surface 234 at its inner end to engage eccentric 228, and is provided with axial extensions 229 formed with axially spaced grooves 236 to receive clamp rings 238, which surround all the connecting rods and retain their arcuate surfaces in engagement with eccentric 228. Slight shoulders 240 normally prevent axial movement of rings 238 in grooves 236.

At their radially outward ends, connecting rods 232 are bored, in directions parallel to axis 204, the centers of the bores 241 being spaced inwardly from the outward ends of the connecting rods by less than the radius of the bores, so that the latter define in the ends of the connecting rods arcuate recesses of greater than 180° extending parallel to axis 204.

A wrist pin 242 is carried in each bore 241. The wrist pins have ridges 244 at their ends to prevent them from sliding axially in bores 241, and have flattened lateral surfaces 246 which enable them to be inserted laterally into bores 241. After insertion, the wrist pins are rotated about their own axes to positions in which they are held by the configurations of bores 241. Each flat surface is tapped to receive a fastener 248 which passes through a washer 250, a diaphragm 210, and a piston 212 to secure these members to one another and to wrist pins 242.

Crakshaft 216, connecting rods 232, and wrist pins 242 move in a bath of oil within crankcase 200, an oil filler 252 and an oil drain plug 254 being provided, and bearings 218 and 222 being equipped with or acting as oil seals.

Fluid to be pumped is admitted to each cylinder head at an inlet 256 through a poppet inlet check valve 258, from the inlet channel 260 of a manifold 262, having a common inlet connection 264 for all three cylinders. Similarly, fluid is discharged from the cylinder outlets 266 through like poppet outlet check valves into an outlet channel 268 of manifold 262, having a common outlet connection 270 for all the cylinders. The outlet channel is tapped at 272 to receive a pulsation damper, not shown.

Figure 5:
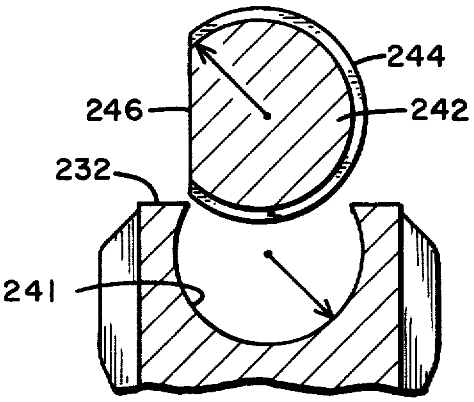
FIG. 5 is an illustrative sketch.
Figure 8:
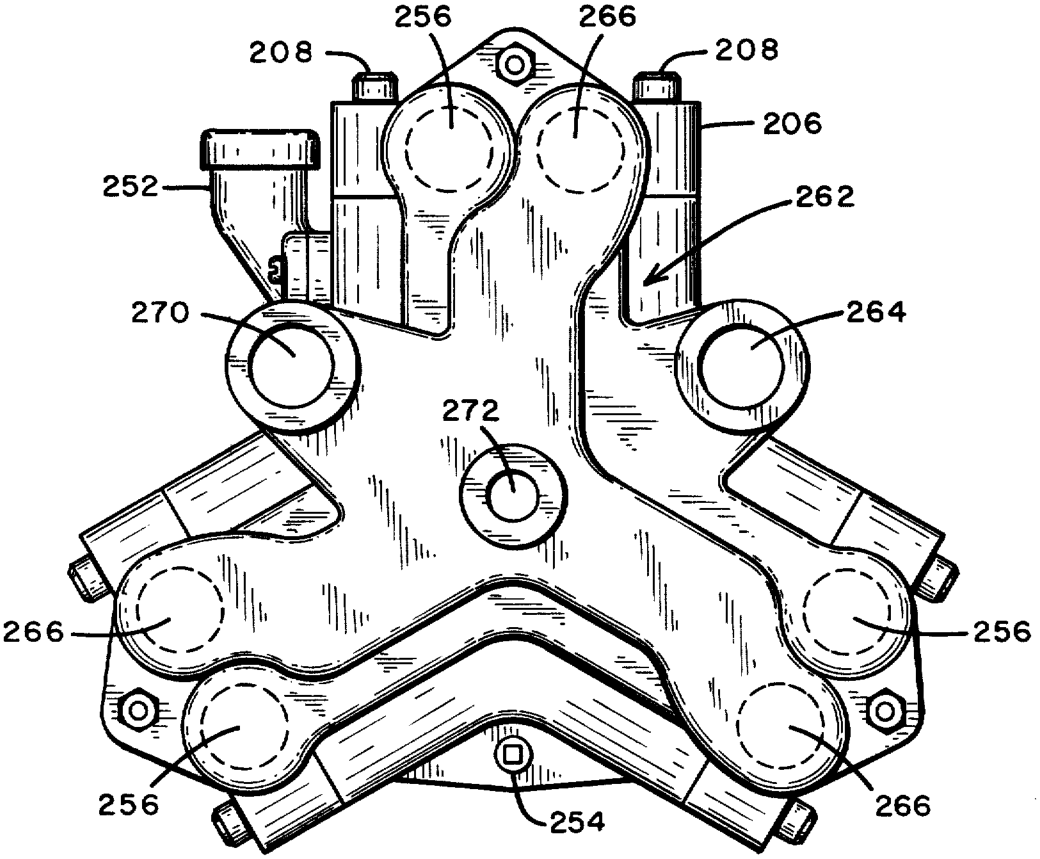
FIG. 8 is an end view of the pump showing a combined inlet and outlet manifold.

Assembly of the radial pump begins with the crankcase, to which cylinder liners 202 are inserted. Wrist pins 246 are next inserted transversely into connecting rods 232, as shown in FIG. 5, rotated to secure positions, and passed through the cylinder liners until rings 238 can be passed over shoulders 240 and received in grooves 236 of all the connecting rods. Crankshaft 216 is now inserted through the open end of the crankcase until its inner end seats in bearing 218 and its crank portion 228 engages the arcuate ends 234 of connecting rods 232. End plate 224 with bearing 222 may now be installed. Next, a piston 212 is inserted into each cylinder to engage the flat surface of the wrist pin, a fastener 248 is passed through a washer 250 and a diaphragm 211 and these assembled to each wrist pin 246. The cylinder heads 206 may now be mounted to secure the rims of the diaphragms, and manifold 262 may be secured to the cylinder heads. After filling with oil, the pump is now ready for fluid connection to conduits at 264 and 270, and for driving connection to a suitable motor at splines 231.

The eccentricity of crank portion 228 is of course appropriate to the amount of radial movement expected from the diaphragm. As crankshaft 216 rotates crank portion 228 causes connecting rods 232 to move radially, the motion being transmitted to the pistons and diaphragms by the wrist pins, which have the necessary freedom of rotation in the connecting rods. As before, the structure has the advantage that service or replacement of any diaphragm, piston, piston ring, or wrist pin may be accomplished simply by removing the cylinder head of the cylinder affected, without requiring access to the interior of the crankcase.

The invention has been described herein in considerable detail in order to comply with the patent statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. In a fluid handling pump of the type having a crankshaft with at least one portion thereof eccentrically offset from the axis of rotation of said crankshaft and plunger means disposed in a cylinder bore for reciprocatory movement therein, the improvement comprising:

(a) single piece connecting rod means of a predetermined thickness dimension having a first bore passing through said thickness dimension for encompassing said one portion of said crankshaft and a second bore of a predetermined radius formed through said thickness dimension at a location displaced inwardly of an end edge of said connecting rod means by a distance less than said predetermined radius to define an arcuate recess in said end edge;

(b) a generally cylindrical wrist pin means having an outside diameter slightly less than two times said predetermined radius and a flattened lateral surface such that said wrist pin is insertable in and rotatably held in said second bore; and (c) means for attaching said plunger means to said flattened surface of said wrist pin.

2. The fluid handling pump of claim 1 and further including bearing means disposed in said first bore and encompassing said one portion of said crankshaft.

3. The fluid handling pump as in claim 1 wherein said plunger means comprises:

(a) a cylindrical tube member; and (b) a plunger head member including guide means and seal means positioned thereon for cooperating with said cylinder bore, said plunger head member being juxtaposed with one end of said cylindrical tube member.

4. The apparatus as in claim 3 wherein said means for attaching said plunger means to said wrist pin comprises an elongated bolt passing through said plunger head member, through said cylindrical tube and into a threaded aperture formed in said wrist pin normal to said flattened lateral surface.

5. Apparatus as in claim 3 wherein said cylinder bore comprises a cylinder block having a cylindrical bore formed therein and a tubular adapter sleeve disposed in said cylindrical bore in said cylinder block, said plunger head member having an outer diameter less than the inside diameter of said adapter sleeve.

6. A fluid handling pump comprising:

(a) a crankcase;

(b) a crankshaft having a predetermined number of cylindrical lobes eccentrically disposed relative to the axis of rotation of said crankshaft;

(c) bearing means disposed in said crankcase for rotatably supporting said crankshaft;

(d) a cylinder block secured to said crankcase and having said predetermined number of axial bores formed therein;

(e) an inlet port and an outlet port formed in said cylinder block;

(f) poppet valve means disposed between said inlet port and said axial bores and between said outlet port and said axial bores;

(g) piston means disposed in said axial bores;

(h) single piece connecting rod means comprising a plate member having a first aperture therethrough the thickness dimension of said plate member for receiving one of said cylindrical lobes therein and a planar rectangular edge surface, the center of which lies on a perpendicular bisector passing through the center of said first aperture, said connecting rod having a second aperture of a predetermined radius extending through its thickness dimension and having its center disposed on said perpendicular bisector and offset from said planar edge by a distance less than said predetermined radius to thereby form an arcuate recess in said planar edge;

(i) generally cylindrical wrist pin means having a flat formed on a lateral surface thereof, said wrist pin means being generally of a diameter slightly less than two times said predetermined radius and being insertable in and rotatably held within said arcuate recess; and (j) means securing said wrist pin means to said piston members.

7. Apparatus as in claim 6 and further including roller bearing means disposed in said first aperture and encompassing said one of said cylindrical lobes.

8. A pump comprising, in combination:

(a) plunger means disposed for reciprocatory movement in a cylindrical bore;

(b) a crankshaft disposed for rotation about an axis orthogonal to the bore and having at least one crank portion of circular cross-section eccentrically offset from said axis;

(c) connecting rod means, extending in a radial direction between a first end at said crankshaft and a second end spaced therefrom, having at said first end an arcuate surface orthogonal to said radial direction for engaging said crank portion of said crankshaft, and having a bore of predetermined radius centered at a location which is displaced inwardly from said second end by a distance less than said predetermined radius, to define an arcuate recess of greater than 180° extending parallel to said axis;

(d) generally cylindrical wrist pin means having an outside diameter substantially twice said predetermined radius, and a flattened lateral surface to enable said wrist pin means to be inserted transversely into said bore and then rotated therein to disable transverse movement therefrom;

(e) and means attaching said plunger means to said flattened surface.

9. Apparatus according to claim 8 further including means maintaining said arcuate surface in engagement with said crank portion.

10. Apparatus according to claim 8 including a plurality of plungers, a like plurality of connecting rods, and means maintaining the arcuate surfaces of said connecting rods in engagement with said crank portion.

11. Apparatus according to claim 10 in which said connecting rods include axially projecting extensions and the last named means engages surfaces of said extensions outward from said axis.

12. Apparatus according to claim 11 in which said extensions project axially in both directions.

13. Apparatus according to claim 11 in which the last named means comprises a ring surrounding said crank portion and inwardly engaging said extensions.

14. Apparatus according to claim 13 in which said extensions include means for preventing axial movement of said ring with respect thereto.

15. Apparatus according to claim 10 further including a cylinder head at the outer end of each said cylindrical bore, each said cylinder head including an inlet and an outlet directed parallel to said axis, said inlets and said outlets respectively being located symmetrically with respect to said axis;

and a manifold secured axially to said pump and having an inlet opening, an inlet channel connecting said inlet opening with said inlets, an outlet opening, and an outlet channel connecting said outlet opening with said outlets.

16. Apparatus according to claim 15 in which said cylinder heads include input and output poppet valves.

* * * * *